United States Patent [19]
Ward et al.

[11] Patent Number: 6,153,017
[45] Date of Patent: Nov. 28, 2000

[54] TREATMENT OF SOIL CONTAMINATED WITH OIL OR OIL RESIDUES

[75] Inventors: Owen P. Ward; Ajay Singh, both of Waterloo, Canada

[73] Assignee: Petrozyme Technologies Inc., Canada

[21] Appl. No.: 09/239,479

[22] Filed: Jan. 28, 1999

[30] Foreign Application Priority Data

Jan. 29, 1998 [CA] Canada ................................. 2228098

[51] Int. Cl.$^7$ ............... B08B 7/00; B08B 7/04; B08B 9/20; C10G 1/00
[52] U.S. Cl. ................... 134/10; 134/6; 134/7; 134/10; 134/25.1; 208/390
[58] Field of Search ............ 134/6, 7, 10, 25.1; 208/428, 390, 693; 210/680

[56] References Cited

U.S. PATENT DOCUMENTS

| | | | |
|---|---|---|---|
| 3,017,342 | 1/1962 | Bulat et al. ........................ | 208/11 |
| 3,862,963 | 1/1975 | Hoshi et al. ........................ | 252/428 |
| 4,072,794 | 2/1978 | Tomita et al. ...................... | 428/378 |
| 4,115,266 | 9/1978 | Ohshima ............................ | 210/80 |
| 4,230,566 | 10/1980 | Faudree, III ..................... | 210/693 |
| 4,367,098 | 1/1983 | McCord ............................ | 134/1 |
| 4,401,571 | 8/1983 | Ney ................................. | 210/680 |
| 4,424,081 | 1/1984 | Giguere ............................ | 134/10 |
| 4,537,877 | 8/1985 | Ericcson ........................... | 502/402 |
| 4,626,356 | 12/1986 | Suzuki et al. .................... | 210/705 |
| 4,753,917 | 6/1988 | Grenthe ............................ | 502/404 |
| 4,783,739 | 11/1988 | Zafiroglu .......................... | 428/102 |
| 4,829,045 | 5/1989 | Fransham .......................... | 502/401 |
| 4,841,998 | 6/1989 | Bruya .............................. | 134/10 |
| 4,891,131 | 1/1990 | Sadeghi et al. ................... | 208/390 |
| 4,925,343 | 5/1990 | Raible et al. .................... | 405/60 |
| 4,929,341 | 5/1990 | Thirumalachar et al. ......... | 208/390 |
| 5,160,629 | 11/1992 | Brown ............................. | 210/671 |
| 5,184,678 | 2/1993 | Pechkov et al. .................. | 166/249 |
| 5,223,147 | 6/1993 | Rosenstock et al. .............. | 210/705 |
| 5,238,575 | 8/1993 | Waldmann ......................... | 210/680 |
| 5,252,215 | 10/1993 | McFarlane et al. .............. | 210/69.1 |
| 5,376,183 | 12/1994 | Everett et al. ................... | 134/25.1 |
| 5,514,218 | 5/1996 | Woodmansee et a l. ............ | 134/7 |
| 5,585,319 | 12/1996 | Saitoh et al. ..................... | 502/404 |
| 5,689,024 | 11/1997 | Schmitt ............................ | 585/467 |
| 5,690,811 | 11/1997 | Davis et al. ...................... | 208/428 |

*Primary Examiner*—Randy Gulakowski
*Assistant Examiner*—Yolanda E. Wilkins
*Attorney, Agent, or Firm*—Gifford, Krass, Groh, Sprinkle, Anderson & Citkowski, P.C.

[57] ABSTRACT

A method for removal of hydrocarbon materials from solid particulate soil contaminated with the hydrocarbon materials. The method comprises forming an aqueous slurry of a mixture of a hydrophobic adsorbent selected from foamed synthetic materials or natural materials which entrap gas, with the soil in the presence of water. The adsorbent has a density less than water. The slurry is mixed for a period of time, and a gravity separation of the adsorbent from the aqueous admixture thus obtained is effected.

25 Claims, No Drawings

TREATMENT OF SOIL CONTAMINATED WITH OIL OR OIL RESIDUES

FIELD OF THE INVENTION

The present invention relates to a method for the treatment of soil materials contaminated with hydrophobic organic substances, viz. oil or oil residues, and in particular to a method for removal of such hydrophobic organic substances in which the soil material is substantially comprised of clay and/or sand. Oils and oil residues are referred to herein as hydrocarbon materials.

Reference is made herein to the use of adsorbent materials. However, it is to be understood that those materials might also exhibit absorbent properties with respect to the hydrocarbon materials viz. oils and oil residues. In addition, as used herein, soil includes clays and sands.

BACKGROUND OF THE INVENTION

In a variety of industries, or for other reasons, soils may become contaminated with hydrocarbon materials. In particular, the soil may be adjacent to oil wells or related facilities in the oil industry e.g. storage tanks, oil pipe lines, oil loading facilities or the like, including lake or ocean environments. In oil processing, transport and storage, various amounts of soils, other particulate matter and water are found suspended in oil, for example, in tank bottoms and oily sludges, and there is a desire or need to separate these components. Leaks of oil, including diesel and gasoline, often occur from storage tanks, at transfer stations and gas pumps, contaminating soil on the property which requires remediation to remove contaminants.

Owners of sites containing soils contaminated with hazardous substances or companies that produce solids contaminated with oil or oil residues may be required by governmental or other regulations to remediate these hydrocarbon materials. Examples of known methods of doing so include application of biological, physical or chemical methods to remove or stabilize/destroy the substances, or to transfer the contaminated material to approved off-site landfills. The methods used to remediate solid materials include bioremediation, aqueous soil washing including use of surfactants, soil extraction with organic solvents, thermal desorption and incineration. Although such methods may be effective, they also tend to be expensive.

There is substantial interest in development of cost effective methods for removing or remediating oil and oil residues from solid particulate materials such as soil. Because of the low solubility of these hydrocarbon materials in water, such hydrocarbon materials tend to tightly adsorb on or absorb into the solid materials and consequently are less amenable to biodegradation by microorganisms which normally requires an aqueous phase for growth and metabolism.

In the oil exploration and production industry, contaminated soils and especially sands are produced during pumping of oils from oil wells. Such soils and sands often contain heavy oils, and typically settle at the bottom of field collection tanks at the oil well. In addition, where oils are mined, for example, during extraction of oils from tar or bitumen-containing sands, the processed sands often contain residual oil contaminants. In other cases, soils or sands may be contaminated as a result of oil spills or leaks. All such oils, heavy oils, residual oils in tar sands and the like are understood to be hydrocarbon materials.

It has been observed that the degree of difficulty of extracting or remediating hydrocarbon materials from soil increases with an increased content of clay and/or humic substances or organic carbon in the soil. In the petroleum industry, it is also known that in oil-contaminated soils containing a mixture of particle sizes varying from coarse sand to clay fines, the majority of the oil is found to associate with the clay fines material. This causes the clay fines material to have a lower density, so that it can be separated using gravity separation methods when present in an aqueous suspension of oil-contaminated soil.

A variety of cellulosic materials have been used in oil sorption. For example, the use of peat is disclosed in U.S. Pat. No. 4,829,045, and the use of cellulosic fibre materials that have been subjected to heating is disclosed in U.S. Pat. Nos. 4,753,917 and 5,585,319.

The use of polymeric materials has been disclosed. U.S. Pat. No. 4,737,394, discloses the use of fibrous polyolefin layers of polyethylene or polypropylene, and U.S. Pat. No. 5,514,218 discloses the use of nitrile-butadiene rubber materials. The use of wool knops has been disclosed in U.S. Pat. No. 5,252,215 and the use of a matrix of intermingled non-woven polyolefin fibres, shredded polyolefin film and cellulosic fibres has been disclosed in WO 92/07918.

Methods for the separation of hydrocarbon materials, especially oils, from soils, particularly clays and sand, are required to effect removal of such hydrocarbon materials from soils on a more economic basis.

SUMMARY OF THE INVENTION

A method for removal of hydrocarbon materials from solid particulate soil contaminated with the hydrocarbon materials has now been found.

Accordingly, one aspect of the present invention provides a method for removal of hydrocarbon materials from solid particulate soil contaminated with the hydrocarbon materials, comprising:
  a) forming an aqueous slurry of a mixture of a hydrophobic adsorbent selected from foamed synthetic materials with said soil in the presence of water, the adsorbent having a density less than water;
  b) mixing said slurry for a period of time; and
  c) effecting a gravity separation of the adsorbent from the aqueous admixture thus obtained.

In another aspect, the present invention provides a method for removal of hydrocarbon materials from solid particulate soil contaminated with the hydrocarbon materials, comprising:
  a) forming an aqueous slurry of a mixture of a hydrophobic adsorbent selected from natural materials which entrap gas, and cellular or foamed materials prepared by synthesis or modification of natural fibres with said soil in the presence of water, the adsorbent having a density less than water;
  b) mixing said slurry for a period of time; and
  c) effecting a gravity separation of the adsorbent and sorbed hydrocarbon material from the aqueous admixture thus obtained.

In a preferred embodiment, the adsorbent is a natural material with entrapped gas-containing pores.

In preferred embodiment of the methods of the present invention, the slurry is subjected to a step to permit settling of soil and other particulate prior to effecting separation of the adsorbent.

In further embodiments, the admixing of the slurry effects contact between the adsorbent and the soil.

In another embodiment, a surfactant is added to the slurry to effect separation of the hydrocarbon material from the soil, said surfactant being selected in an amount that does not inhibit adsorption of the hydrocarbon material on the adsorbent.

In a further embodiment, an oil material may be added to the aqueous slurry to promote better mobilization of the contaminant from the soil particles to the adsorbent and/or for better sorption.

In yet another embodiment, the water content of the aqueous slurry is at least 25% by weight of the soil, especially 25–100% by weight.

In a further embodiment, the soil is comprised of clay and/or sand.

DETAILED DESCRIPTION OF THE INVENTION

The method of the invention involves mixing the soil, water, with or without any other agents e.g. surfactant and the adsorbent. These components may be added and mixed with the soil in a single operation or by adding and mixing individual components in any sequence. Mixing may be accomplished using processes known in the art, including using reactors, tanks with air spargers, impellers, rakes, screw assemblies or stirrers, rotating drums e.g. similar to a cement mixer, tumblers, reactors on reciprocating or orbital shaking machines, vibration or sonication mixers and screw or other conveyor equipment.

The slurry is preferably directed to a settling step, which may be accomplished in the mixing vessel or a following conveyance, including by pouring or other transfer of the slurry to a separating vessel which may or may not contain additional water to promote separation of soil and adsorbent/oil. The mixing and or separation stages may be carried out in a batch or continuous mode.

The separated floating oily-adsorbent material is recovered and may be further processed to recover some or all of the oil from the adsorbent by a variety of methods e.g. compression, heating or washing. The oily adsorbent or deoiled adsorbent may be volume reduced by thermal or solvent treatment or using other physical or chemical methods which melt the polymer and destroy the cellular structure or depolymerize or otherwise modify the polymer, or the adsorbed oil or the mixture.

In the method of the present invention, an aqueous slurry is formed from a mixture of a hydrophobic adsorbent and soil. The soil may be obtained from a wide variety of sources, and is soil that has been contaminated with a hydrocarbon material. The soil is a solid particulate, which may be in a variety of forms. However, in preferred embodiments of the invention, the solid particulate includes clays and/or sand. The soil may also consist of spent drilling muds which can contain mixtures of water, petroleum oils, other organic liquids, inorganic and organic additives, suspended solids and drill cuttings. Sand or clay may also become contaminated with drilling muds. Thus in embodiments, the solid particulate soil may be substantially or even essentially comprised of clays and sand, and may be generally referred to as sandy or clay soils. As examples of the sources of the solid particulate soil, the soil may be from locations around oil wells where the soil is contaminated by the oil pumped from the ground. The soil may also be soil from the locations in the oil industry, including processing areas, storage tank or other locations where oil may come in contact with the soil. In addition, in the oil industry, the solid particulate soil could be a by-product of the mining of oil for example the material remaining after mining and extraction of oil products in oil sands recovery operations. The soil also may be present in the form of oil-water-particulate mixtures or sludges in refinery separators, tank bottoms and lagoons. The soil may be contaminated with various oils including diesel and gasoline from leaks from tanks, valves or pumps at petroleum storage areas, transfer stations and gas outlets. In addition, the oils subjected to the method in the invention may also be in the form of bitumen, tars and pitches including extracts from coal and wood, creosotes, transformers and transmission oils, mineral oil, refined and synthetic oils and lubricants, oil by-products, oil extracts, waxes and greases. Furthermore, the oil could be a biological oil or fat e.g. materials derived from animal, plant and microbial sources, which may be described as lipids.

A variety of adsorbent materials may be used, which as discussed above may also exhibit absorbent properties towards the hydrocarbon materials. Examples of adsorbents are given below. The preferred adsorbents are hydrophobic and float in water e.g. have a density of less than one, and are particularly effective in promoting flotation of the hydrophobic adsorbent with associated hydrocarbon materials.

The adsorbent materials are foamed synthetic materials, especially polymeric foams or cellular polymers, which contain a large number of pockets or pores which entrap gas and substantially decrease the apparent density of the material. When the cells or pores are interconnected, the material is described as open-celled, whereas when cells are discreet, they are termed closed celled. The foamed synthetic materials, which may be rigid or flexible, are produced by production methods including methods including extrusion, expansion, froth foaming, compression and injection moulding and sintering.

Examples of foamed synthetic materials are foams of synthetic materials of polystyrene, polyvinylchloride, polyethylene, polyurethane, epoxy and phenolic and urea-formaldehyde resins, silicones, cellulose acetate, polytetrafluoroethylene, ebonite, natural and foam rubber. Other foamed polymers include novel biodegradable foam materials incorporating modified polysaccharides, including starches. The foamed synthetic materials, may be mixtures of polymers or copolymers. For example, the susceptibility of polystyrene foams to attack by some petroleum solvents led to the development of styrene-acrylonitrile copolymers which are resistant to these materials.

The foamed synthetic materials may be in a variety of shapes and sizes including sheets, discs, spheres, other shapes, extruded cylindrical fibres (spaghetti), as well as in other various forms including irregular shapes produced by disintegration of larger moulded materials. Key properties for the invention are the hydrophobic properties of the foam surfaces promoting selective sorption of hydrophobic oil components and their low apparent densities which when coupled with moisture resistance provides high buoyancy or flotation characteristics. This facilitates separation of the particles containing sorbed oil from the heavier solids and aqueous liquid phases. Closed-cell structures tend to maximize flotation characteristics.

Foams can also be classified as rigid or flexible. In general, more rigid foams are preferred for flotation applications.

Example of ranges of densities of some rigid foam plastics are polystyrene, 32–160 $kg/m^3$; polyvinyl chloride, 32–64 $kg/m^3$; polyurethanes 32–128 $kg/m^3$; cellulose acetate 96–128 $kg/m^3$ phenolic forms, 32–64 $kg/m^3$. Polystyrene foams produced by the decompression expansion process have a density in the range of 23–53 $kg/m^3$.

In addition, adsorbents that may be used in the method of the invention include natural materials having pockets which entrap gas, for example, particles of lignocellulose, cellulose or other plant materials which contain gas filled pores. In addition, cellular or foamed materials prepared by synthesis or modification of natural fibres or polymers including cellulose, lignocellulose, starches, proteins and lipids, combinations of these and mixtures of natural polymers and synthetic chemicals or copolymers may be used.

The choice of preferred adsorbents will be determined by a variety of considerations, including flotation and sorption properties. Highest flotation efficiency is observed with adsorbents having limited or no external pores, e.g. expanded polystyrene beads with a surface "skin". Maximum sorption is observed with cellular adsorbents which have an external open pore structure. Materials which have external pores allowing effective binding of contaminant and/or penetration into the adsorbent but which retain some gas filled cells will promote high efficiencies of both sorption and contaminant separation by flotation.

The adsorbent is not, however, limited to foamed materials and may involve use of non-foamed adsorbent particles which have a density of less than one. The adsorbent may also be polymeric particles, both hydrophobic and non-hydrophobic, which may be coated with a hydrophobic surface layer.

In embodiments, an amount of adsorbent is added which promotes partial or full separation of the hydrocarbon from the soil. Preferably, the foamed absorbent has a concentration of 0.1–1% w/w of soil.

The aqueous slurry used in the method of the present invention preferably contains at least 25% by weight of water, based on the weight of soil material, and especially 25–100% by weight of water. Higher amounts of water may be used, but such higher amounts tends to lead to additional costs in the forming of the slurry. In the subsequent separation of the adsorbent from the aqueous mixture, the amount of water should be sufficient to effect efficient floating of sorbent/oil above the soil in the mixture. Thus, higher amounts of water may be preferred e.g. at least 100% by weight of water based on the weight of the soil material, and especially 100–200% by weight, although higher amounts may be used.

The time period for mixing of the aqueous slurry of adsorbent and soil may be varied, depending on the mixing method. For reactors placed on an orbital shaker at 200 rpm, as described in the examples, the preferred mixing times are 2–8 hours. Shorter times may be less efficient in the separation, whereas although longer times may be used, they are not believed to provide greater efficiency.

Effective separation may normally be achieved by gravity separation (flotation), but supplementary methods may be used to improve the rate of separation, reduce water content and/or reduce residual water content in the soil.

Transfer of the hydrocarbon material from the sand or soil particles to the added polymers in an aqueous medium may be accelerated or facilitated by addition of a suitable surfactant capable of partially emulsifying the contaminant in the aqueous medium. The concentration of surfactant used should be high enough to promote contaminant mobilization from the sand or soil particles but not so high as to inhibit adsorption of the contaminant to the polymer. Thus, the contaminant may be released from the particles into the aqueous phase as an emulsion and then bound by the polymers.

Preferred surfactants are non-ionic or anionic, or blends of non-ionic and anionic surfactants. Examples of non-ionic surfactants are alcohol ethoxylates, alkylphenol ethoxylates and fatty acid ethoxylates. Examples of anionic surfactants include alkane and alkene sulphonates. Preferred surfactant concentration ranges will depend on soil type and surfactant type. With sand in a 1:1 w/v slurry with water, the preferred concentration of the alkylphenol ethoxylate, Igepal™ Co-630, is 0.05–0.1 per cent based on sand weight. Soils with more clay content may require higher surfactant concentrations.

In some cases, addition of a small amount of oil may result in transfer of the contaminate from the contaminated particles to the adsorbent. For example, an emulsified vegetable oil, light mineral oil or other hydrophobic solvent might assist in transfer of the oil and oil residues from the soil particle to the cellular adsorbent.

The method of the present invention may be operated as a continuous process or as a batch process.

In embodiments of the invention, there is provided a step for recovery of the hydrocarbon material from the adsorbent separated from the aqueous mixture.

The method may involve a single extraction process or a multiple extraction process where, following removal of the separated oil-sorbent material, the soil is again treated with additional adsorbent. The method of the invention may also be used as part of a soil treatment train, where other physical, chemical or biological methods are used as a pre-intermediate or post-treatment to remove a portion of the oil contaminant. The method may also be used to selectively remove oil contaminants from soil containing oil and other contaminants, and to remove oil from soil where the oil itself also contains other oil soluble organic contaminants.

The present invention is illustrated by the following examples.

EXAMPLE I

In this example, foamed polystyrene of the type used for packing material was used as an oil adsorbent. Oil contaminated sands, containing about 5.5% total petroleum hydrocarbons (TPH), were used in the form of a 50% (w/v) slurry.

A mixture of 25 g oily sand, 25 ml water, 0.25% (w/v) of polystyrene and 0.05% (w/v) of Igepal CO-630 surfactant was put on a rotary shaker at 200 rpm of 4 hours. An additional 25 ml water was added and the polystyrene material/oil was separated by decanting after settling of sand for 5 minutes.

Residual total petroleum hydrocarbon (TPH) content in the sand was measured.

The residual TPH content in sand was determined by extracting with 25 ml hexane and centrifuging at 10,000 rpm for 20 min. The hexane layer (top) was pipetted out and transferred to a pre-weighed vial. The hexane was allowed to evaporate in a fume hood and residual oil was weighed to determine the TPH content.

The results obtained are given in Table I.

TABLE 1

| | Adsorbent material | Size (mm) | TPH removal (%) |
|---|---|---|---|
| A. | Foamed polystyrene (broken packing, skinless) | 4–6 | 92 |
| B. | Expanded polystyrene beads (with skin) | 1.5 | 70 |

The results indicated that about 90% of oil can be extracted out of oily sands using a single extraction when the adsorbent polystyrene packing material is used. Unless otherwise stated adsorbent A was used in all of the following examples.

EXAMPLE II

In this example, packing foamed polystyrene was used at different concentrations for the adsorption of oil from contaminated sands. A 50% (w/v) slurry was prepared in a flask, and the desired concentration of broken foamed polystyrene and 0.05% (w/v) of Igepal CO-630 surfactant were added. The contents were mixed on a shaker at 200 rpm for 4 hours. An additional 25 ml water was added and residual TPH content in sand was determined after separation of polystyrene material/oil.

TABLE 2

| Polystyrene concentration (%, w/v) | TPH removal (%) |
| --- | --- |
| 0.05 | 30 |
| 0.1 | 49 |
| 0.2 | 76 |
| 0.25 | 92 |
| 0.3 | 87 |
| 0.4 | 85 |
| 0.5 | 87 |

The results indicate that oil extraction increased with the increasing concentration of polystyrene up to 0.25% (w/v), and thereafter no significant increase was observed.

EXAMPLE III

A series of tests were conducted to determine effects of water content in the oil sand slurry on oil adsorption by packing foamed polystyrene. Mixtures of 25 g oily sand, the desired amount of water, 0.25% (w/v) of polystyrene and 0.05% (w/v) of Igepal CO-630 surfactant were mixed on shaker at 200 rpm for 4 hours. The polystyrene material was separated and residual TPH content in sand was measured.

The results are shown in Table 3.

TABLE 3

| Soil:Water ratio (w/v) | TPH removal (%) |
| --- | --- |
| 1:0 | 43 |
| 1:0.25 | 76 |
| 1:0.5 | 89 |
| 1:0.75 | 87 |
| 1:1 | 92 |
| 1:2 | 86 |
| 1:3 | 84 |
| 1:4 | 76 |
| 1:5 | 78 |

Optimum range of sand to water ratio in a slurry was found to be from 1:0.5 to 1:1.

EXAMPLE IV

The effect of surfactant concentration on oil adsorption from oil contaminated sand by packing foamed polystyrene was tested. Surfactant, Igepal CO-630 was used in this example. 25 g oily sand, 25 ml water, 0.25% (w/v) of polystyrene and different concentrations of surfactant were mixed on a shaker at 200 rpm for 4 hours. The polystyrene material/oil was separated and residual TPH content in sand was measured.

The results are shown in Table 4.

TABLE 4

| Surfactant concentration (%, w/v) | TPH removal (%) |
| --- | --- |
| 0 | 84 |
| 0.025 | 87 |
| 0.05 | 92 |
| 0.1 | 89 |
| 0.2 | 92 |
| 0.3 | 89 |

The results show that the presence of surfactant was slightly beneficial in extraction of oil from the oil contaminated sand. No significant improvement in oil extraction was observed above the surfactant concentration of 0.05%.

EXAMPLE V

In this example, oil adsorption in different soil types by packing foamed polystyrene was tested. To a 50% (w/v) soil slurry, 0.25% (w/v) of foamed polystyrene and 0.05% (w/v) of Igepal CO-630 surfactant were added and mixed on a shaker at 200 rpm of 4 hours. The polystyrene material/oil was separated and residual TPH content in soil was measured.

The results are shown in Table 5.

TABLE 5

| Soil type | TPH concentration (%) | TPH removal (%) |
| --- | --- | --- |
| Oil contaminated sand | 5.5 | 96 |
| Bitumen (Tar) sand | 3.4 | 98 |
| Produced Sand | 0.6 | 80 |
| Oil contaminated clay/sand oil | 2.0 | 71 |
| Crude oil contaminated garden soil | 3.0 | 97 |
| Diesel contaminated garden soil | 6.8 | 90 |
| Kerosene contaminated garden soil | 3.0 | 96 |
| Heavy crude contaminated garden soil | 4.0 | 97 |
| Motor oil contaminated garden soil | 3.2 | 92 |
| Clay fines | 10.0 | 78 |
| Refinery sludge | 4.0 | 80 |
| Refinery sludge | 2.0 | 95 |

The results in Table 5 indicate that foamed polystyrene may be used to adsorb oil from a variety of soil types with oil extraction efficiencies 71–98%. The highest extraction efficiency was observed with crude or heavy oil contaminated sands.

EXAMPLE VI

The effect of extraction/mixing time on oil adsorption from oil contaminated sand by foamed polystyrene was investigated by incubating a mixture of 20 g oily sand, 25 ml water, 0.25% (w/v) of polystyrene and 0.05% (w/v) Igepal CO-630 surfactant on shaker at 200 rpm for different time periods ranging from 2 h to 24 h. The foamed polystyrene/oil was separated and residual TPH content in the sand was measured.

The results are shown in Table 6.

TABLE 6

| Mixing Time (h) | TPH removal (%) |
| --- | --- |
| 2 | 83 |
| 4 | 88 |
| 8 | 90 |
| 16 | 93 |
| 24 | 94 |

The optimum mixing time was found to be from 4–24 h.

EXAMPLE VII

In this example, the effect of temperature on oil adsorption from oil contaminated sand by foamed polystyrene was investigated. A mixture of 25 g oily sand, 25 ml water, 0.25% (w/v) of polystyrene and 0.05% (w/v) Igepal CO-630 surfactant was shaken using temperature-controlled shakers (200 rpm) for 4 h at 4, 15, 23 and 30° C. The foamed polystyrene/oil was separated and residual TPH content in the sand was measured.

The results are shown in Table 7.

TABLE 7

| Temperature (° C.) | TPH removal (%) |
| --- | --- |
| 4 | 66 |
| 15 | 83 |
| 23 | 88 |
| 30 | 89 |

It was found that maximum removal of oil was observed at 23–30° C.

EXAMPLE VIII

In this example, adsorption of vegetable oil from garden soil was tested. To 25g garden mixed with 25 ml of water, 1.0% (w/v) peanut oil was added. The mixture was shaken at 200 rpm for 10 min. The flask was treated with 0.25% foamed polystyrene and mixed for 4 h, then allowed to stand for 5 min to allow sorbed oil to separate. 97% of the vegetable oil was removed from the soil using this method.

EXAMPLE IX

Using conditions from the previous examples, the process was scaled up to industrial mixing equipment viz. a 6 ft$^3$ concrete or mortar mixer. 30 kg of crude oil-contaminated sand was mixed for 8 hours with 30 kg of water and two doses of 0.125% w/v broken foamed polystyrene, with removal of the first dose of broken foamed polystyrene before addition of the second dose of broken foamed polystyrene. The concrete mixer was operated at 50 rpm and the mortar mixture operated at 75 rpm. The crude oil-contaminated sand contained 3.4% by weight of oil.

Samples of the homogeneous mixture were taken over the course of the experiment. The polystyrene material was separated and the residual TPH content in the sand was measured. The results obtained are given in Table 8.

TABLE 8

| | | % Crude oil removal from sand | |
| --- | --- | --- | --- |
| Adsorbent | Time (h) | Concrete Mixer | Mortar Mixer |
| First dose | 0.5 | 54.5 | 49.8 |
| | 1 | 68.1 | 56.9 |
| | 2 | 68.1 | 64.7 |
| | 4 | 71.4 | 79.3 |
| Second dose | 4.5 | 90.2 | 92.7 |
| | 5 | 93.1 | 93.5 |
| | 6 | 95.7 | 95.0 |
| | 8 | 97.1 | 92.4 |

Both of the industrial mixers showed good mixing of the sand, water and adsorbent, which indicates that the results in the laboratory can be achieved on a large scale. Up to 80% of the crude oil was removed by the first 0.125% dose of adsorbent. Most of the remainder was extracted quickly by the second dose of adsorbent.

EXAMPLE X

The recovery of oil from the separated adsorbent of Example IX was determined.

A sample of separated adsorbent obtained from the tests in Example IX was placed in a hydraulic press and the expressed oil and water was collected. It was found that approximately 60–75% of the original oil present in the soil could be recovered.

What is claimed is:

1. A method for removal of hydrocarbon materials from solid particulate soil contaminated with the hydrocarbon materials, comprising:
    a) forming an aqueous slurry of a mixture of a hydrophobic adsorbent selected from foamed synthetic materials with said soil in the presence of water, the adsorbent having a density less than water;
    b) mixing said slurry for a period of time; and
    c) effecting a gravity separation of the adsorbent from the aqueous admixture thus obtained.
2. The method of claim 1 in which the slurry is subjected to a step to permit settling of soil and other particulate prior to effecting separation of the adsorbent.
3. The method of claim 2 in which the admixing of the slurry effects contact between the adsorbent and the soil.
4. The method of claim 3 in which a surfactant is added to the slurry to effect separation of the hydrocarbon material from the soil, said surfactant being selected in an amount that does not inhibit adsorption of the hydrocarbon material on the adsorbent.
5. The method of claim 3 in which an oil material may be added to the aqueous slurry to promote better mobilization of the contaminant from the soil particles to the adsorbent and/or for better sorption.
6. The method of claim 3 in which the water content of the aqueous slurry is at least 25% by weight of the soil.
7. The method of claim 6 in which the water content of the aqueous slurry is 25–100% by weight of the soil.
8. The method of claim 1 in which the soil is comprised of clay and/or sand.
9. The method of claim 1 in which the foamed adsorbent has a concentration of 0-1-1% w/w of soil.
10. The method of claim 1 in which an amount of adsorbent is added which promotes partial or full separation of the hydrocarbon from the soil.
11. The method of claim 1 in which the foamed adsorbent is a polymer or copolymer of styrene.

12. A method for removal of hydrocarbon materials from solid particulate soil contaminated with the hydrocarbon materials, comprising:
   a) forming an aqueous slurry of a mixture of a hydrophobic adsorbent selected from natural materials which entrap gas, and cellular or foamed materials prepared by synthesis or modification of natural fibres with said soil in the presence of water, the adsorbent having a density less than water;
   b) mixing said slurry for a period of time; and
   c) effecting a gravity separation of the adsorbent and sorbed hydrocarbon material from the aqueous admixture thus obtained.

13. The method of claim 12 in which the adsorbent is a natural material with entrapped gas-containing pores.

14. The method of claim 12 in which the adsorbent is a foamed material prepared from natural polymers or fibres with or without synthetic copolymers.

15. The method of claim 12 in which the slurry is subjected to a step to permit settling of soil and other particulate prior to effecting separation of the adsorbent.

16. The method of claim 1 in which the hydrocarbon material is a plant or animal oil or lipid.

17. The method of claim 1 in which the hydrocarbon material is an oil or oil residue.

18. The method of claim 12 in which the hydrocarbon material is an oil or oil residue.

19. The method of claim 1 in which the hydrocarbon material contains other dissolved hazardous chemicals.

20. The method of claim 12 in which the hydrocarbon material contains other dissolved hazardous chemicals.

21. The method of claim 1 in which a partial removal of hydrocarbon material from the soil is effected.

22. The method of claim 1 in which the foamed absorbent is mixed with the soil in the absence of water, with water being added to effect gravity separation.

23. The method of claim 1 in which a petroleum fraction-contaminant solubilizing solvent or an animal or vegetable oil is added to the aqueous slurry to effect separation of the contaminant from the soil and its adsorption to the adsorbent.

24. The method of claim 12 in which a petroleum fraction-contaminant solubilizing solvent or an animal or vegetable oil is added to the aqueous slurry to effect separation of the contaminant from the soil and its adsorption to the adsorbent.

25. The method of claim 1 in which there is a step for recovery of the hydrocarbon material from the adsorbent separated from the aqueous admixture.

* * * * *